Feb. 10, 1970

E. R. ECKERT 3,494,331

LIVESTOCK FEEDING APPARATUS

Filed May 13, 1968

Inventor
Elmer R. Eckert
By Andrus & Starke
Attorneys

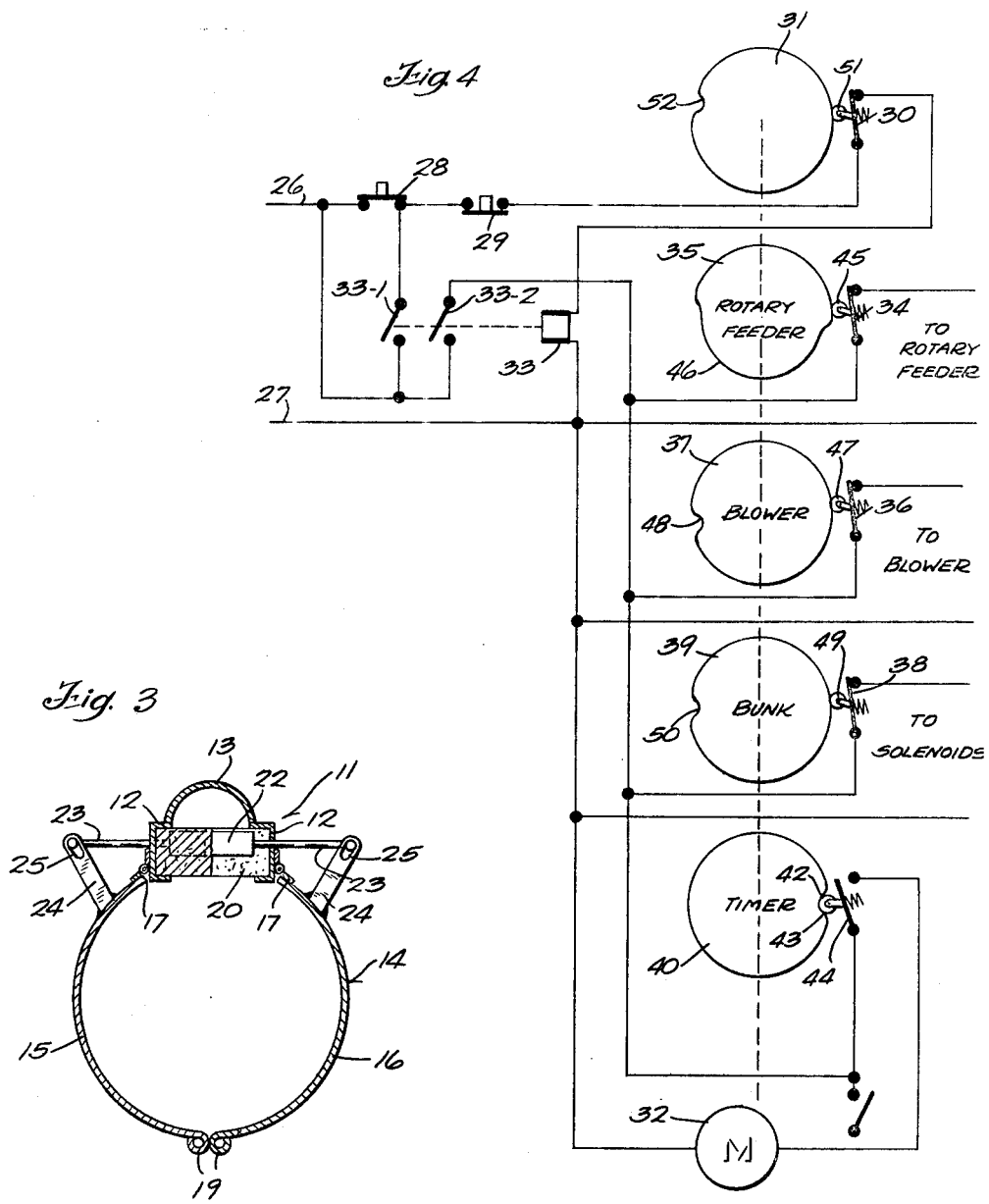

United States Patent Office 3,494,331
Patented Feb. 10, 1970

3,494,331
LIVESTOCK FEEDING APPARATUS
Elmer R. Eckert, Geneseo, Ill., assignor to A. O. Smith Corporation, Milwaukee, Wis., a corporation of New York
Filed May 13, 1968, Ser. No. 728,591
Int. Cl. A01k 5/00
U.S. Cl. 119—51.11                                    8 Claims

ABSTRACT OF THE DISCLOSURE

The invention relates to a livestock feeding apparatus utilizing a pneumatic system for conveying feed. The apparatus includes a feed tube extending along the length of the bunk, and the upper portion of the feed tube is provided with an opening which is enclosed by a porous, air permeable membrane, while the lower portion of the tube is provided with an elongated discharge opening which is enclosed by a door. Feed entrained in an air stream is introduced into one end of the tube, while the opposite end of the tube is closed, and the feed is deposited throughout the length of the tube while the air is discharged through the porous membrane. When the tube is filled with a predetermined quantity of feed, the door is opened to simultaneously discharge feed along the entire length of the feed bunk.

---

Recently there has been increased activity in automatic feeding systems for livestock in which feed is transferred from a source and automatically distributed to the feed bunk or other feed area. In most feeding systems, mechanical equipment is used to convey feed within a feed tube or housing which extends along the length of the feed bunk. The use of a mechanical system has disadvantages, particularly when the feed bunk has a substantial length, for the mechanical system requires a large number of moving parts and the mechanical handling of the feed acts to produce segregation of the feed particles.

The present invention is directed to a livestock feeding apparatus utilizing a pneumatic system for conveying feed.

According to the invention the apparatus includes a tube or housing which extends along the length of the feed area and the upper portion of the housing is provided with an elongated slot which is enclosed by a porous, air permeable membrane. The lower portion of the housing is provided with a discharge opening which extends throughout the length of the housing and is enclosed by a door. One end of the housing is closed and feed entrained in an air stream is introduced into the opposite end of the housing, so that the feed will be deposited throughout the length of the housing while the air is discharged through the porous membrane to the exterior. When the housing, is filled with a predetermined amount of feed, the door is automatically opened to discharge feed to the entire length of the feed area which is located beneath the housing.

The feed mechanism of the invention is simple and economical to fabricate and has a minimum number of moving parts as compared to a mechanical handling system. Moreover, the apparatus is capable of distributing feed along a feed bunk having a substantial length.

As the feed is conveyed in a moving stream of air, rather than through mechanical handling principles, segregation of the various feed particles is minimized.

As a further advantage, the feed is distributed simultaneously and uniformly along the entire length of the feed bunk, thereby preventing an accumulation of feed in the portion of the feed bunk located beneath the inlet end of the feeder, which is apt to occur with a system in which the feed is continuously discharged from the feeder to the feed bunk.

Other objects and advantages will appear in the course of the following description.

The drawings illustrate the best mode presently contemplated of carrying out the invention.

In the drawings:

FIG. 3 is a transverse section of the feed conveyor housing; and

FIG. 4 is a wiring diagram.

Figure 1:
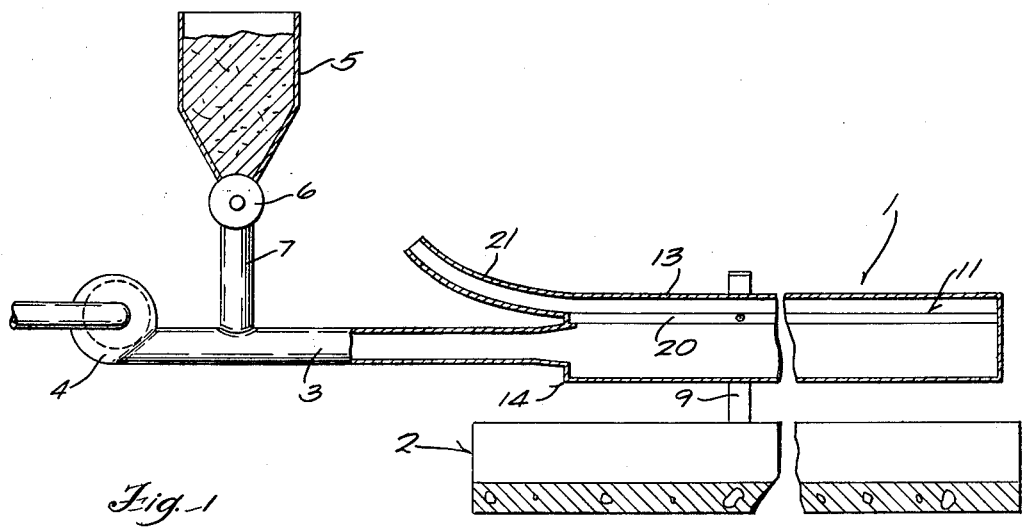
FIG. 1 is a diagrammatic view of the pneumatic conveying feed system of the invention.
Figure 2:
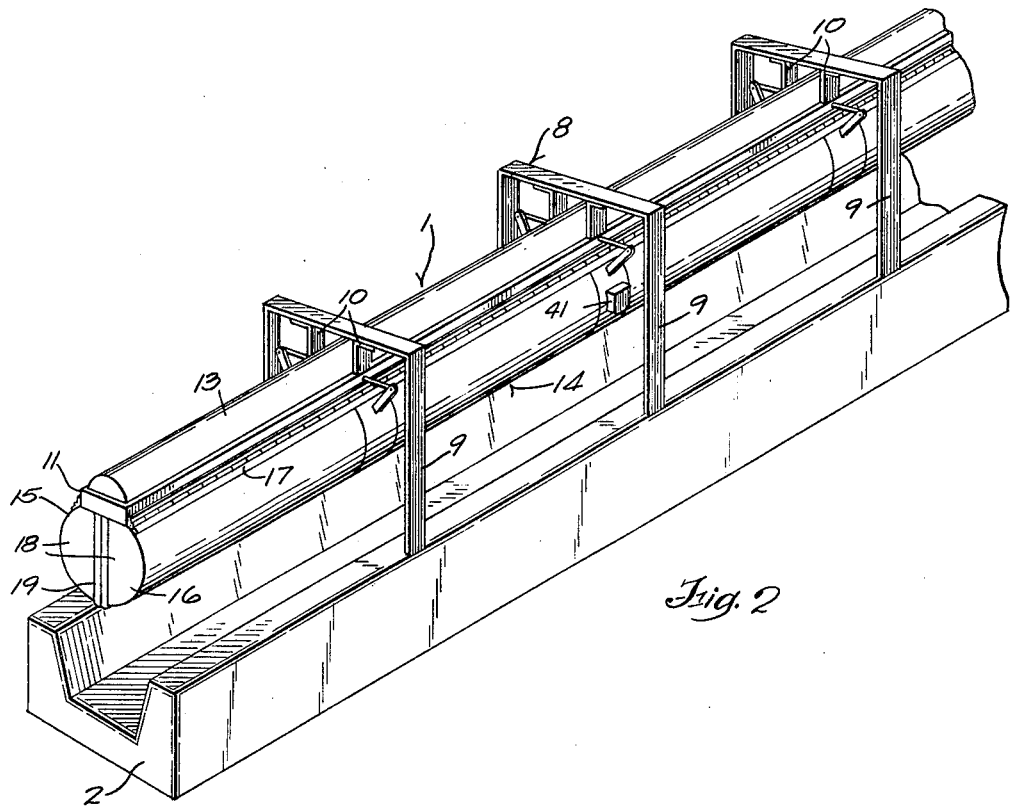
FIG. 2 is a perspective view of the feed conveyor housing.

The drawings illustrate a pneumatic livestock feeding apparatus including a feed unit 1 which is located above a feed bunk 2 and extends substantially the entire length of the feed bunk. Feed entrained in an air stream is introduced into the feed unit through an inlet line 3 which is connected to the outlet of a blower 4. The feed to be fed to the livestock is contained within a hopper 5 and is fed continuously by a rotary feeder 6 through line 7 to the inlet line 3 where the feed is entrained in the air stream and delivered to the feed unit 1.

The feed material can be any common feed for livestock such as silage, grain, haylage or the like.

The feed unit 1 includes a frame 8 consisting of a series of spaced U-shaped supports 9 and the legs of the U supports 9 are supported on the side walls of the feed bunk 2. Extending downwardly from the web or cross member of each of the U supports 9 are a pair of vertical supports 10 which carry a backbone 11 which extends the length of the frame. The backbone 11 comprises a pair of spaced, opposed channel members 12 and a generally semi-cylindrical housing 13 is secured to the channels 12 and defines a discharge passage for the air.

A conveying tube 14 is carried by the backbone 11 and comprises a pair of halve sections 15 and 16, with each half being connected by a hinge 17 to the corresponding channel 12 of the backbone frame 11. One end of the tube 14 is closed off by the end members 18 which are secured to the respective sections 15 and 16, while the other end of the conveying tube 14 is in communication with the inlet line 3 so that the air containing the entrained feed will be discharged into the tube 14.

To seal the abutting ends of the sections 15 and 16, a gasket or seal 19 is located along the abutting edges and provides a substantially airtight seal between the members. The particular construction of seal 19 is not critical and may take the form of any conventional resilient or inflatable sealing element capable of preventing air flow between the conveyor sections 15 and 16.

According to the invention a porous member 20, which is permeable to the passage of air but will prevent the feed particles from passing therethrough, is located between the channels 12 of the backbone 11 and acts to separate the interior of the conveying tube 14 from the interior of the discharge housing 13. As the air stream containing the entrained feed particles passes within the tube 14, the air will be discharged through the porous member 20, while the feed will be deposited throughout the length of the tube 14.

The porous member 20 can be any conventional material which will permit the air to flow readily therethrough, and will prevent the feed particles from passing through. The member 20 may be either of the disposable or recleanable type. A commercial material sold under the trade name Fibermet, which is a glass filament reinforced, stainless steel fiber mat impregnated with polytetrafluoroethylene (Teflon) resin, has proven particularly satisfactory as the porous membrane 20. Other types of metallic or fibrous filter materials can also be used.

The air passing through the porous membrane 20 is discharged to the atmosphere through the outlet 21 connected to the end of the housing 13.

A provision is made to automatically discharge the feed from the entire length of the tube 14. To accomplish this action, a series of solenoids 22 are located in spaced relation between the channels 12 of backbone 11 and plungers 23 operably connected to each solenoid extended laterally through openings in the channels 12. Plungers 23 are pivotally connected to the upper ends of arms 24 and the lower ends of the arms are attached to the outer surfaces of the conveyor sections 15 and 16. When solenoids 22 are actuated, drawing the plungers 23 inwardly, the sections 15 and 16 will be pivoted upwardly to thereby discharge the feed from the conveyor tube 14. The slots 25 formed in the arms 24 will enable the sections 15 and 16 to be pivoted upwardly by action of the solenoids 22.

FIGURE 4 is a wiring diagram showing the electrical control circuit for the pneumatic feeding system of the invention. As shown in FIG. 4, lines 26 and 27 are connected to a source of a suitable power, and by depressing the start button 28 the circuit is completed through the start button, through stop button 29, switch contacts 30 on master cam 31 of timing motor 32, relay coil 33 to line 27. Closing of the circuit energizes the coil 33 which closes the contacts 33–1 and 33–2. Closing of contacts 33–1 maintains the coil 33 energized when the start button is released, and closing of contacts 33–2 acts to apply power through the closed switch contacts 34 on rotary feeder cam 35 to the motor for the rotary feeder 6, through the closed switch contacts 36 of blower cam 37 to the blower 4, and through switch contacts 38 of bunk cam 39 to the bunk solenoids 22. In addition to cams 31, 35, 37 and 39, cam 40 is also ganged with the other cams and driven by the timer motor 32.

Actuation of the blower 4 and rotary feeder 6 will act to deliver the entrained feed into the conveyor tube 14 where the feed will be deposited in the tube and the air will be discharged through the membrane 20. When the tube 14 is substantially full of feed, a pressure switch 41 which is located on the inner surface of one of the conveyor sections is closed, thereby starting operation of the timer motor 32. Operation of the timer motor 32 will act to rotate the cams and as cam 40 rotates, the follower 42 will drop into the notch 43 on cam 40, thereby opening switch 44 and overriding switch 41 to prevent premature closing of the conveyor sections before complete discharge of feed to the feed bunk.

Continued rotation of the cams causes the follower 45 to ride in the recess 46 of cam 35 to thereby open the switch 34 and stop the rotary feeder 6. Subsequently, the follower 47 will ride into the notch 48 on cam 37 to thereby open the switch 36 and stop operation of the blower 4. Continued rotation of the timer motor 32 will cause the follower 49 to ride into the notch 50 of cam 39 to open the switch 38 and actuate the solenoids 22 to move the plungers 23 inwardly and cause the conveyor sections 15 and 16 to pivot upwardly, thereby discharging the feed from the conveyor tube 14 to the feed bunk 2.

Following this, the follower 51 will ride into the notch 52 in cam 31 to open the switch contacts 30 and thereby interrupt the circuit to the power lines. The timing motor cams are spring returned to their original starting position and the system will then be ready for the next cycle.

The present invention provides a simple and economical apparatus for conveying feed throughout the length of a feed bunk. As the system relies on pneumatic principles, there are a minimum number of moving parts and segregation of the feed particles, which normally accompanies a mechanical handling system, is minimized.

The feed system includes a provision for automatically stopping operation of the blower 4 and rotary feeder 6 and opening the conveyor sections 15 and 16 when the conveyor tube is substantially full to thereby discharge feed simultaneously throughout the entire length of the feed bunk.

While the above drawings show the feed mechanism utilized with the feed bunk, it is contemplated that the feed mechanism can be associated with any type of feeding area.

Various modes of carrying out the invention are contemplated as being within the scope of the following claims particularly pointing out and distinctly claiming the subject matter which is regarded as the invention.

I claim:

1. A livestock feeding apparatus, comprising a tubular member extending along a length of a feed area and having a first opening therein, an air permeable member enclosing said first opening, means for introducing air into one end of said tubular member, means for entraining a feed material in the air stream before the air is introduced into said tubular member, said particles being deposited throughout the length of said tubular member and said air being discharged through said air permeable member, and means for dumping the feed from the entire length of the tubular member to said feed area.

2. A livestock feeding apparatus, comprising a hollow member extending along a feed area and having a first opening and a second opening with said first and second openings extending along a substantial length of said member, air permeable means enclosing said first opening, closure means for enclosing said second opening, means for introducing a stream of air containing entrained feed particles into one end of said member, with said particles being deposited throughout the length of said member and said air being discharged through said air permeable means, and operating means for opening said closure means to simultaneously discharge the feed from the entire length of said member to said feed area.

3. The apparatus of claim 2, and including means responsive to a given quantity of feed in said member and operably connected to said operating means for actuating said operating means.

4. The apparatus of claim 2 wherein said first opening is located in the upper portion of said member and said second opening is located in the lower portion of said member.

5. The apparatus of claim 2, and including actuating means responsive to a given quantity of feed in said member for stopping operation of said feed introducing means and subsequently actuating said operating means to thereby discharge the feed from said member after stopping of said feed introducing means.

6. A livestock feeding apparatus, comprising a tube extending along a length of the feed area and having a first opening and a second opening, air permeable means enclosing said first opening, closure means for enclosing said second opening, blower means connected to one end of said tube for introducing air into said tube, feed metering means communicating with said end of the tube for introducing feed into the air stream, said feed being entrained in said air stream deposited throughout the length of said tube and said air being discharged from said tube through said air permeable means, closure operating means for opening said closure means to discharge the feed from the entire length of the tube to the feed area, and means responsive to a given quantity of feed being deposited in said tube and operably connected to said blower means, said feed metering means and said closure operating means to thereby stop operation of said blower means and said feed operating means and actuate said operating means to thereby discharge feed from the tube to the feed area.

7. The apparatus of claim 6, and including time delay means for delaying actuation of said closure operating means for a given period of time after stopping of said blower means and said feed metering means.

8. The apparatus of claim 6, and including a tubular housing disposed on the exterior of the tube and communicating with said first opening, said air being discharged through said air permeable means and into said housing.

References Cited

UNITED STATES PATENTS

| | | | |
|---|---|---|---|
| 1,707,206 | 3/1929 | Bernert | 302—22 |
| 2,743,965 | 5/1956 | Mattson et al. | 302—59 |
| 3,310,349 | 3/1967 | Tilley et al. | 302—59 |
| 3,428,098 | 2/1969 | Slay | 141—67 |

ALDRICH F. MEDBERY, Primary Examiner

U.S. Cl. X.R.

119—52; 141—67; 302—59